(12) United States Patent
Tsao et al.

(10) Patent No.: US 10,083,146 B2
(45) Date of Patent: Sep. 25, 2018

(54) SHARED USB PORTS

(71) Applicant: HEWLETT PACKARD ENTERPRISE DEVELOPMENT LP, Houston, TX (US)

(72) Inventors: Chin-Jung Tsao, Taipei (TW); Kang-Jong Peng, Taipei (TW); Chih-Sheng Liao, Taipei (TW); Chao-Lin Hsiao, Taipei (TW)

(73) Assignee: Hewlett Packard Enterprise Development LP, Houston, TX (US)

( * ) Notice: Subject to any disclaimer, the term of this patent is extended or adjusted under 35 U.S.C. 154(b) by 65 days.

(21) Appl. No.: 15/358,824

(22) Filed: Nov. 22, 2016

(65) Prior Publication Data
US 2018/0143936 A1 May 24, 2018

(51) Int. Cl.
G06F 13/42 (2006.01)
H04L 12/24 (2006.01)
G06F 13/40 (2006.01)
G06F 13/38 (2006.01)

(52) U.S. Cl.
CPC ........ *G06F 13/4282* (2013.01); *G06F 13/385* (2013.01); *G06F 13/4022* (2013.01); *H04L 41/082* (2013.01); *H04L 41/0816* (2013.01); *G06F 2213/0026* (2013.01); *G06F 2213/0042* (2013.01)

(58) Field of Classification Search
None
See application file for complete search history.

(56) References Cited

U.S. PATENT DOCUMENTS

| 7,073,010 B2 * | 7/2006 | Chen | G06F 13/385 710/313 |
| 7,827,436 B2 * | 11/2010 | Yang | G06F 9/44505 714/4.1 |
| 8,352,644 B2 * | 1/2013 | Malamant | G06F 1/3203 710/20 |

(Continued)

FOREIGN PATENT DOCUMENTS

CN 201490478 U * 5/2010
CN 103369737 A * 10/2013
(Continued)

OTHER PUBLICATIONS

"Open Platform Management Architecture Specification," Jan. 2008, pp. 1-105, Publication #: 32200, Revision: 1.3, Advanced Micro Devices, Inc.

*Primary Examiner* — Steven Snyder
(74) *Attorney, Agent, or Firm* — Hewlett Packard Enterprise Patent Department

(57) ABSTRACT

In one example in accordance with the present disclosure, a system comprises a first computing device comprising a first baseboard management controller (BMC), a second computing device comprising a second BMC, a first universal serial bus (USB) port coupled to the first BMC, a second USB port coupled to the second BMC, a multiplexor coupled to the first USB port and the second USB port, a shared USB port coupled to the multiplexor, and a chassis manager coupled to the first computing device and the second computing device. The chassis manager may connect, with the multiplexor, the shared port to the first USB port or the second USB port.

14 Claims, 6 Drawing Sheets

(56) References Cited

U.S. PATENT DOCUMENTS

| | | | |
|---|---|---|---|
| 8,387,043 B2* | 2/2013 | Tanaka | G06F 9/5077 718/1 |
| 8,856,772 B2* | 10/2014 | Fan | G06F 8/654 717/168 |
| 8,959,264 B2 | 2/2015 | Decesaris et al. | |
| 9,331,899 B2 | 5/2016 | Christopher et al. | |
| 9,817,468 B2* | 11/2017 | Puthillathe | G06F 1/3293 |
| 2003/0074431 A1 | 4/2003 | Abbondanzio et al. | |
| 2005/0120157 A1* | 6/2005 | Chen | G06F 13/385 710/313 |
| 2007/0233833 A1* | 10/2007 | Wang | H04L 41/04 709/223 |
| 2008/0005222 A1 | 1/2008 | Lambert et al. | |
| 2009/0204965 A1* | 8/2009 | Tanaka | G06F 9/5077 718/1 |
| 2013/0007430 A1* | 1/2013 | Fan | G06F 8/654 713/1 |
| 2015/0006700 A1* | 1/2015 | Wanner | G06F 13/14 709/223 |
| 2015/0074323 A1* | 3/2015 | Chumbalkar | G06F 13/4022 710/316 |
| 2015/0227485 A1* | 8/2015 | Maung | G06F 13/4022 710/316 |
| 2015/0304233 A1* | 10/2015 | Krishnamurthy | H04L 47/762 709/226 |
| 2015/0363340 A1* | 12/2015 | Kelly | G06F 13/102 710/52 |
| 2016/0118121 A1* | 4/2016 | Kelly | G06F 13/4068 710/301 |
| 2017/0004104 A1* | 1/2017 | Meyers | G06F 13/4022 |
| 2017/0024347 A1* | 1/2017 | Dao | G06F 1/185 |
| 2017/0102952 A1* | 4/2017 | Khemani | G06F 9/4411 |
| 2017/0289334 A1* | 10/2017 | Tian | H04M 1/72525 |
| 2017/0315951 A1* | 11/2017 | Tung | G06F 13/4081 |
| 2017/0364375 A1* | 12/2017 | Ku | G06F 9/44505 |
| 2018/0101376 A1* | 4/2018 | Olarig | G06F 8/65 |

FOREIGN PATENT DOCUMENTS

| | | | |
|---|---|---|---|
| CN | 203340306 U | * | 12/2013 |
| JP | 2000353145 A | * | 12/2000 |
| JP | 2001060961 A | * | 3/2001 |
| KR | 100759901 B1 | * | 9/2007 |

* cited by examiner

SHARED USB PORTS

BACKGROUND

A computing device may comprise ports to connect with peripheral devices. In some examples, the ports may perform various management functions.

BRIEF DESCRIPTION OF THE DRAWINGS

The following detailed description references the drawings, wherein.

DETAILED DESCRIPTION

In high-density servers, physical space on the server chassis may be at a premium. For example, there may not be enough room for a universal serial bus (USB) port coupled to a baseboard management controller (BMC) and another USB port connected to a peripheral component hub. As another example, a blade server may have many computing nodes, and there may not be space on a panel of the blade server to allocate a USB port to monitor the health of each computing node.

The techniques of this disclosure describe a USB port that is shared between multiple computing nodes. A multiplexor is used to select the computing device to which the USB port is connected. In some examples, the multiplexor may be coupled to logic that examines the USB device to which the USB port is connected to determine to which computing device the shared USB port should be connected. In some examples, the logic may also determine an action to perform using the USB port based on data stored on the connected USB device or an identifier of the USB device.

Figure 1:
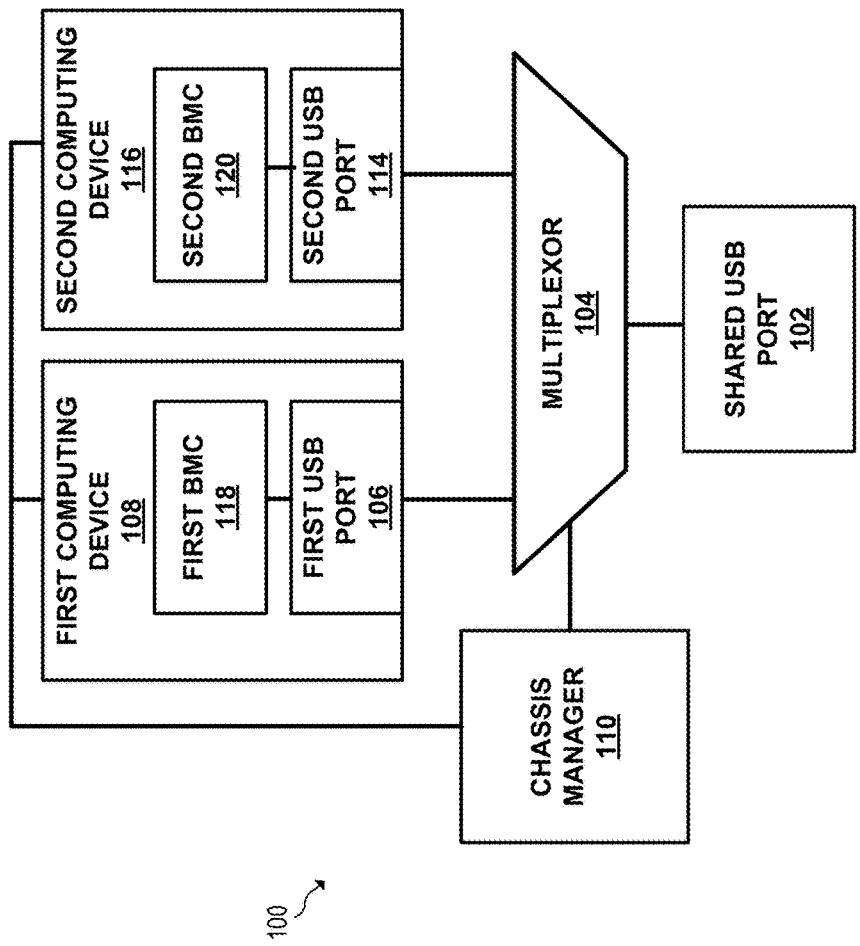
FIG. 1 is a block diagram of an example computing system for invoking singular value decomposition on a data set.

FIG. 1 is a block diagram of an example computing system 100 comprising a shared USB port. System 100 may comprise a high density system, such as a blade server system. FIG. 1 comprises a shared USB port 102. Shared USB port 102 may comprise a may be coupled to a USB device (e.g. USB device 202 illustrated in greater detail in FIG. 2).

Shared USB port 102 is coupled to a multiplexor 104. Multiplexor 104 is coupled with a first USB port 106 of a first computing device 108, and a second USB port 114 of a second computing device 116. First computing device 108 and second computing device 116 may comprise servers, e.g. rack-mountable servers. First USB port 106 is coupled to a first baseboard management controller (BMC) 118, and second USB port 114 is coupled to a second BMC 120.

In various examples, first computing device 108 and second computing device 116 may comprise high-density servers that are mounted in a single chassis. In some examples first computing device 108 and second computing device 116 may comprise blade servers. In some examples, first computing device 108 and second computing device 116 may comprise compute nodes in a high-density server chassis serviced by chassis manager 110. The space available on the chassis of first computing device 108 and second computing device 116 may be limited such that there may not be room for USB ports for both first computing device 108 and second computing device 116.

Chassis manager 110 may comprise an additional processor separate BMC different from first BMC 118 and second BMC 120. In some examples, first BMC 118 and second BMC 120 may comprise chassis manager 110 or part of chassis manager 110. In such examples, first BMC 118 and second BMC may be coupled to a single non-transitory computer-readable storage medium or a plurality of storage media.

First BMC 118 and second BMC 120 may perform management functions, which may comprise so-called "lights out" functionality. Lights out functionality may comprise functionality that a BMC can perform even when first computing device 108 or second computing device 116 is not powered up. Examples of lights out functionality may comprise: updating firmware of a component of a computing device, downloading health logs (e.g. accessing management logs), powering up/down a computing device, obtaining a remote console, mounting media, and the like.

Although only two computing devices and associated USB ports are illustrated in FIG. 1, any number of computing devices and corresponding USB ports may be present. Additionally, to avoid excessive fan-in or other electrical, a hierarchical tree of multiplexors may be present in system 100 rather than a single multiplexor.

Chassis manager 110 is coupled to multiplexor 104, and may control the "select" signal of multiplexor 104. The select signal of multiplexor 104 controls the connection of multiplexor 104 to first USB port 106 and second USB port 114. Thus, because chassis manager 110 controls the select signal of multiplexor 104, chassis manager 110 controls the operation of multiplexor 104 and the connection of shared USB port 102 to first USB port 106 and second USB port 114.

Chassis manager 110 is also coupled to first computing device 108 and second computing device 116. In some examples, chassis manager 110 may be coupled to first computing device 108 and second computing device 116 via an inter-integrated circuit (I2C), system management bus, the like, or any combination thereof. In various examples, chassis manager 110 may comprise a module of a system 100 that provides common management functionality for first computing device 108 and second computing device 116. In various examples, chassis manager 110 may be rack mountable. In various examples, shared USB port 102 may be disposed on chassis manager 110.

In some examples, chassis manager 110 may determine a health status of first computing device 108 and second computing device 116. Chassis manager 110 may connect shared USB port 102 to first BMC 118 coupled to first USB port 106 based on a health status of first computing device 108. For example, if the health status of first computing device 108 indicates a problem with first computing device 108, chassis manager 110 may connect shared USB port 102 to first USB port 106.

Chassis manager 110, first BMC 118, and second BMC 120 may comprise processors, such as controllers, microcontrollers, field-programmable gate arrays (FPGAs), or the like. In some examples, chassis manager 110 may comprise logic gates and may not comprise a processor. In various examples, chassis manager 110, first BMC 118, and second BMC 120 may execute firmware, microcode, or non-transitory instructions stored on read-only memory (ROM). In some examples, chassis manager 110, first BMC 118, and second BMC 120 may be coupled to a memory storing instructions for execution.

Figure 2:
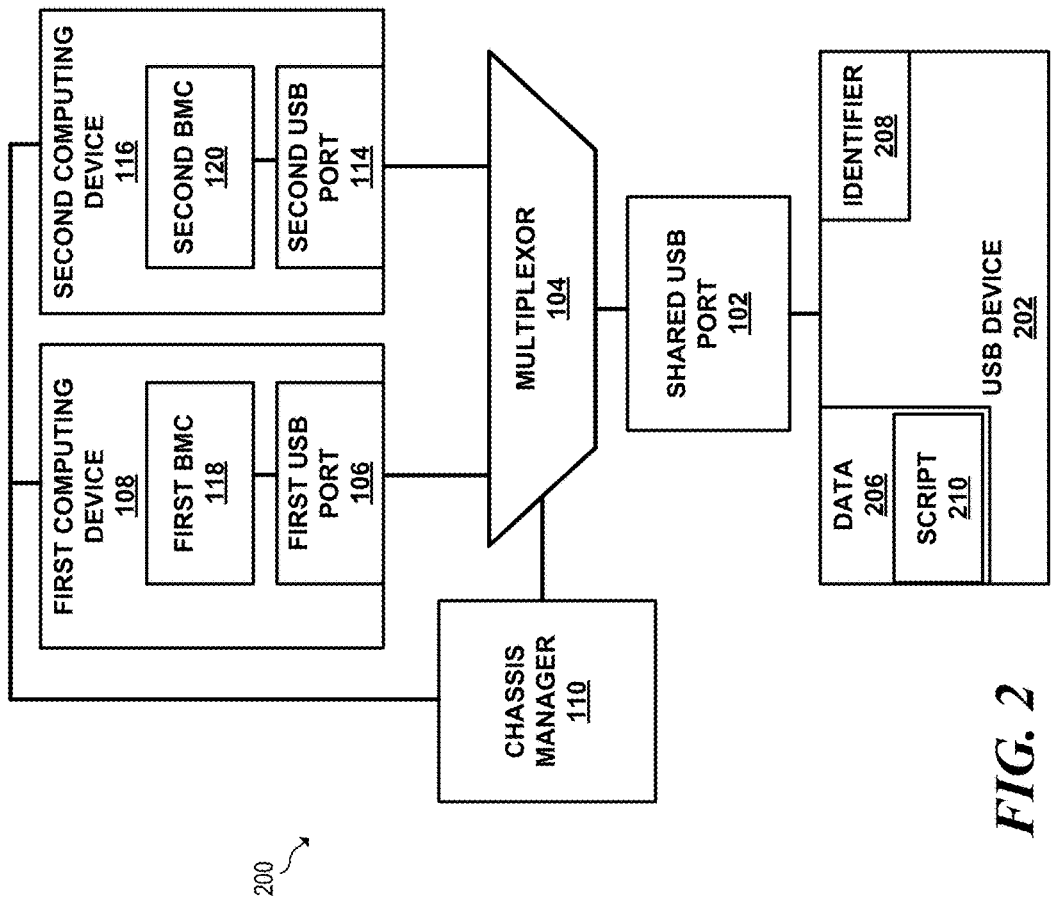
FIG. 2 is a block diagram of another example computing system for invoking singular value decomposition on a data set.

FIG. 2 is a block diagram of an example computing system 200 comprising a shared USB port. System 200 of FIG. 2 may be similar to FIG. 1 in various examples. System 200 also comprises a USB Device 202. USB device 202 may comprise a device such as a storage device (e.g. a flash or hard drive), or any other type of USB device having available storage.

USB Device 202 may comprise a USB identifier, e.g. identifier 208. A USB identifier describes the function that the USB device provides. In various examples, USB device 202 may have a USB identifier that indicates an action that a BMC is to perform. As an example, USB device 202 may have one of the following USB identifiers, and a BMC may perform a corresponding action as described in Table 1, below based on the identifiers:

TABLE 1

USB Identifiers and Corresponding Actions

| Identifier String | Purpose | Actions |
|---|---|---|
| "BMC_USBID_A1" | Health Log Download | BMC will write health log to the storage of the USB device |
| "BMC_USBID_A2" | Firmware Upgrade or Recover | BMC will flash the system with the firmware in the USB device whenever the firmware image in the USB device is newer or if firmware of the computing device has become corrupted |
| "BMC_USBID_A3" | Console | BMC will output console to the USB device |
| "BMC_USBID_A4" | RESERVED | |

In some examples USB device 202 may also have storage that comprises data 206. In some examples, data 206 may comprise a script for execution, e.g. script 210. In some examples, script 210 may comprise XML data comprising a series of commands to be executed by one or more BMCs and/or chassis manager 110. Chassis manager 110 may determine an action to perform based on data 206 stored on USB device 202.

In various examples, script 210 may comprise a first command that is associated with a first BMC of a first computing device, and a second command of a second computing device associated with a second BMC. In examples USB device 202 comprises a script 210, chassis manager 110 may connect shared USB port 102 to execute the first command of script 210, and the corresponding BMC may execute the command. Responsive to the BMC having finished executing the first command, the BMC may signal chassis manager 110 to cause chassis manager 110 to cause multiplexor 104 to connect to the second BMC. Responsive to connecting shared USB port 102 to the second BMC, the second BMC may execute the second command. In some examples, chassis manager 110 may receive signals from first BMC 118 and second BMC 120 and pass them to multiplexor 104 to control the connection of shared USB port 102 to first USB port 106 or second USB port 114.

Chassis manager 110 may determine that a USB device, e.g. USB device 202, has been connected to multiplexor 104. In some examples, chassis manager 110 may examine identifier 208 responsive to USB device 202 being connected to shared USB port 102.

Figure 3:
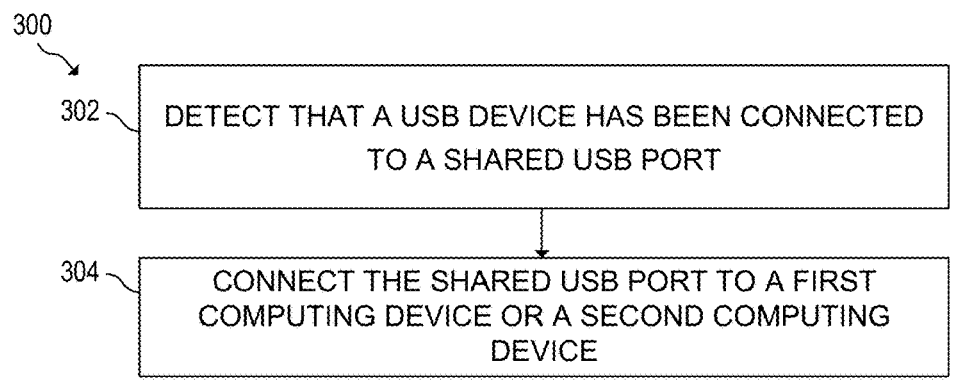
FIG. 3 is a flowchart of an example method for sharing USB ports.

FIG. 3 is a flowchart of an example method for sharing USB ports. FIG. 3 illustrates method 300. Method 300 may be described below as being executed or performed by a system, for example, system 100 of FIG. 1 or computing system 200 of FIG. 2. Other suitable systems and/or computing devices may be used as well. Method 300 may be implemented in the form of executable instructions stored on at least one machine-readable (e.g. a non-transitory) storage medium of the system and executed by at least one processor of the system (e.g. chassis manager 110, first BMC 106, second BMC 114, or the like).

Alternatively or in addition, method 300 may be implemented in the form of electronic circuitry (e.g., hardware). In alternate examples of the present disclosure, one or more blocks of method 300 may be executed substantially concurrently or in a different order than shown in FIG. 3. In alternate examples of the present disclosure, method 300 may include more or less blocks than are shown in FIG. 3. In some examples, one or more of the blocks of method 300 may, at certain times, be ongoing and/or may repeat.

Method 300 may start at block 302 at which point a processor, as described above may detect that a universal serial bus (USB) device has been connected to a shared USB port, wherein the shared USB port is shared, via a multiplexor, between a first baseboard management controller of a first computing device and a second baseboard management controller of a second computing device. At block 304, a chassis manager coupled to the first computing device and the second computing device and by the multiplexor, the shared USB port to the first BMC or the second BMC.

Figure 4:
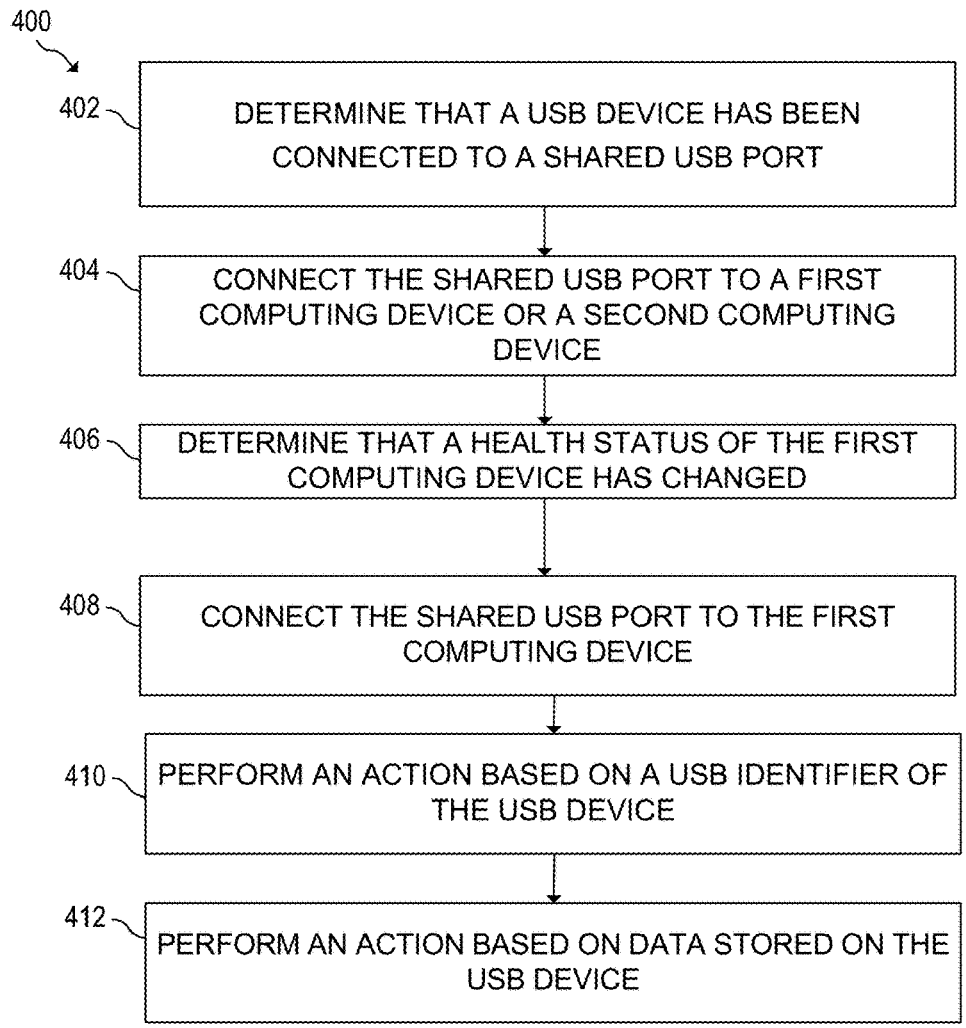
FIG. 4 is a flowchart of another example method for sharing USB ports.

FIG. 4 is a flowchart of another example method for sharing USB ports. Method 400 may be described below as being executed or performed by a system or device, for example, computing system 100 of FIG. 1 or computing system 200 of FIG. 2. Other suitable systems and/or computing devices may be used as well. Method 400 may be implemented in the form of executable instructions stored on at least one machine-readable storage medium of the system and executed by at least one processor of the system.

Alternatively or in addition, method 400 may be implemented in the form of electronic circuitry (e.g., hardware). In alternate examples of the present disclosure, one or more blocks of method 400 may be executed substantially concurrently or in a different order than shown in FIG. 4. In alternate examples of the present disclosure, method 400 may include more or less blocks than are shown in FIG. 4. In some examples, one or more of the blocks of method 400 may, at certain times, be ongoing and/or may repeat.

Method 400 may start at block 402 at which point a processor, as described above may detect that a universal serial bus (USB) device has been connected to a shared USB port, wherein the shared USB port is shared, via a multiplexor, between a first baseboard management controller of a first computing device and a second baseboard management controller of a second computing device. At block 404, a chassis manager coupled to the first computing device and the second computing device and by the multiplexor, the shared USB port to the first BMC or the second BMC.

At block 406, the chassis manager may determine that a health status of the first computing device has changed. At block 408, responsive to determining that the health status has changed, the chassis controller may connect the shared USB port, with the multiplexor, to the first computing device.

At block 410, the method comprises performing an action based on an identifier of a USB device connected to the USB port. In various examples, the action may comprise performing at least one of: downloading a health log to the USB device, updating a firmware of the first computing device or the second computing device, or outputting a console to the USB device downloading a health log to the USB device, updating a firmware of the first computing device or the second computing device, or outputting a console to the USB device.

At block 412 the method may comprise performing an action based on data stored on the USB device. In some examples, the data stored on the USB device may comprise a script. In some examples the method may comprise: executing, with the first BMC, a script stored on the USB device. Executing the excerpt may comprise: performing a first action, with the first BMC, on the first computing device based on a first command of the script; and switching, by the chassis manager, the shared USB port to the second computing device based on a second command of the script.

Figure 5:
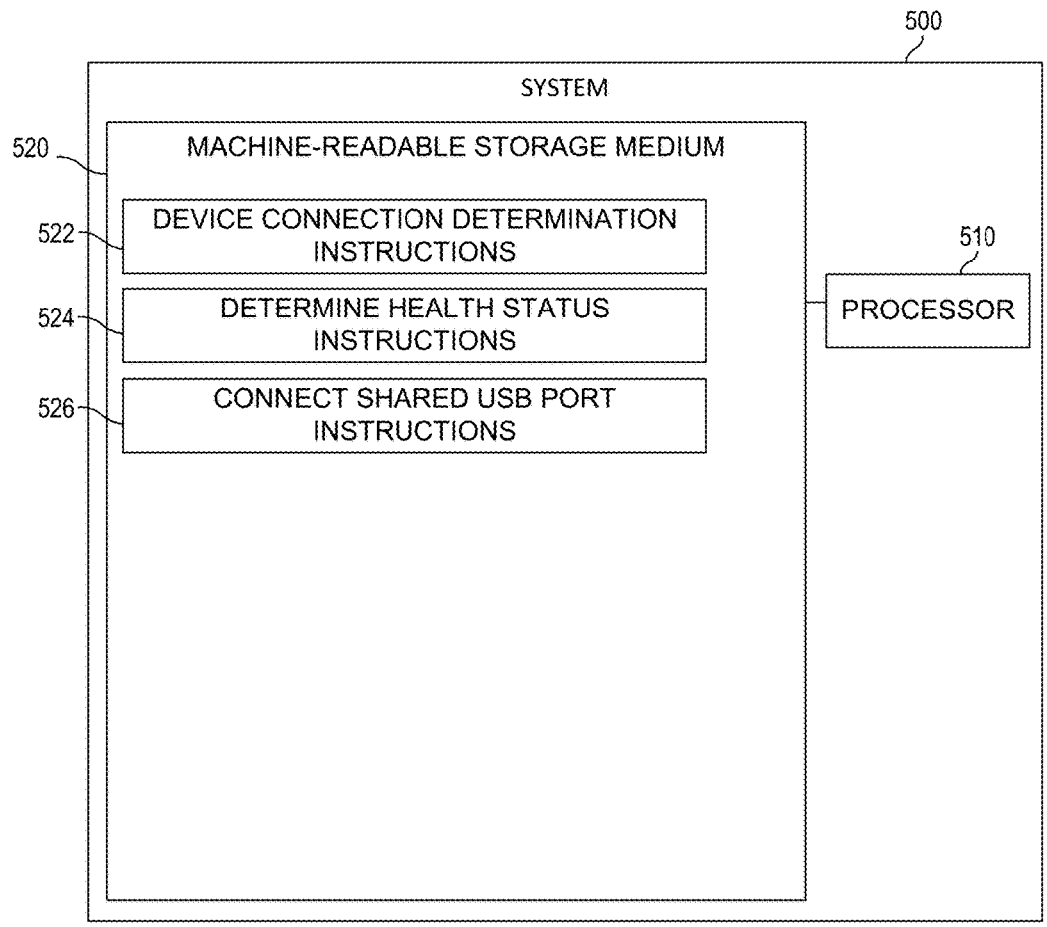
FIG. 5 is a block diagram of an example system for sharing USB ports.

FIG. 5 is a block diagram of an example system for sharing USB ports. System 500 may be similar to system 100 of FIG. 1 or system 200 of FIG. 2, for example. In the example of FIG. 5, system 500 includes a processor 510 and a machine-readable storage medium 520. Processor 510 may comprise chassis manager 110 in various examples. In some examples, processor 510 may comprise first BMC 118, second BMC 120, and chassis manager 110 may comprise logic.

Storage medium 520 is non-transitory in various examples. Although the following descriptions refer to a single processor and a single machine-readable storage medium, the descriptions may also apply to a system with multiple processors and multiple machine-readable storage mediums. For example, processor 510 of system 500 may comprise multiple BMC's (e.g. first BMC 118 and/or second BMC 120) and/or a chassis manager (e.g. chassis manager 110). In such examples, the instructions may be distributed (e.g., stored) across multiple machine-readable storage mediums and the instructions may be distributed (e.g., executed by) across the multiple processors.

Processor 510 may be one or more central processing units (CPUs), microprocessors, and/or other hardware devices suitable for retrieval and execution of instructions stored in machine-readable storage medium 520. In the particular examples shown in FIG. 5, processor 510 may fetch, decode, and execute instructions 522, 524 to share USB ports. As an alternative or in addition to retrieving and executing instructions, processor 510 may include one or more electronic circuits comprising a number of electronic components for performing the functionality of one or more of the instructions in machine-readable storage medium 520. With respect to the executable instruction representations (e.g., boxes) described and shown herein, it should be understood that part or all of the executable instructions and/or electronic circuits included within one box may, in alternate examples, be included in a different box shown in the figures or in a different box not shown.

Machine-readable storage medium 520 may be any electronic, magnetic, optical, or other physical storage device that stores executable instructions. Thus, machine-readable storage medium 520 may be, for example, Random Access Memory (RAM), an Electrically-Erasable Programmable Read-Only Memory (EEPROM), a storage drive, an optical disc, and the like. Machine-readable storage medium 520 may be disposed within system 500, as shown in FIG. 5. In this situation, the executable instructions may be "installed" on the system 500. Alternatively, machine-readable storage medium 520 may be a portable, external or remote storage medium, for example, that allows system 500 to download the instructions from the portable/external/remote storage medium. In this situation, the executable instructions may be part of an "installation package". As described herein, machine-readable storage medium 520 may be encoded with executable instructions to allow sharing of USB ports.

Referring to FIG. 5, device connection determination instructions 522, when executed by a processor (e.g., 510), may cause processor 510 to determine that a universal serial bus (USB) device has been connected to a shared USB port, wherein the shared USB port is coupled to a multiplexor. The first USB port may be coupled to a first baseboard management controller (BMC) of the first computing device and to the multiplexor. The second USB port may be coupled to a second BMC and to the multiplexor.

Determine health status instructions 524, when executed, may cause processor 510 to determine a health status of the first computing device and the second computing device. Connect shared USB port instructions 526, when executed, may cause processor 510 to connect, by the multiplexor, the shared USB port to a first computing device or a second computing device based on the determined health status.

Figure 6:
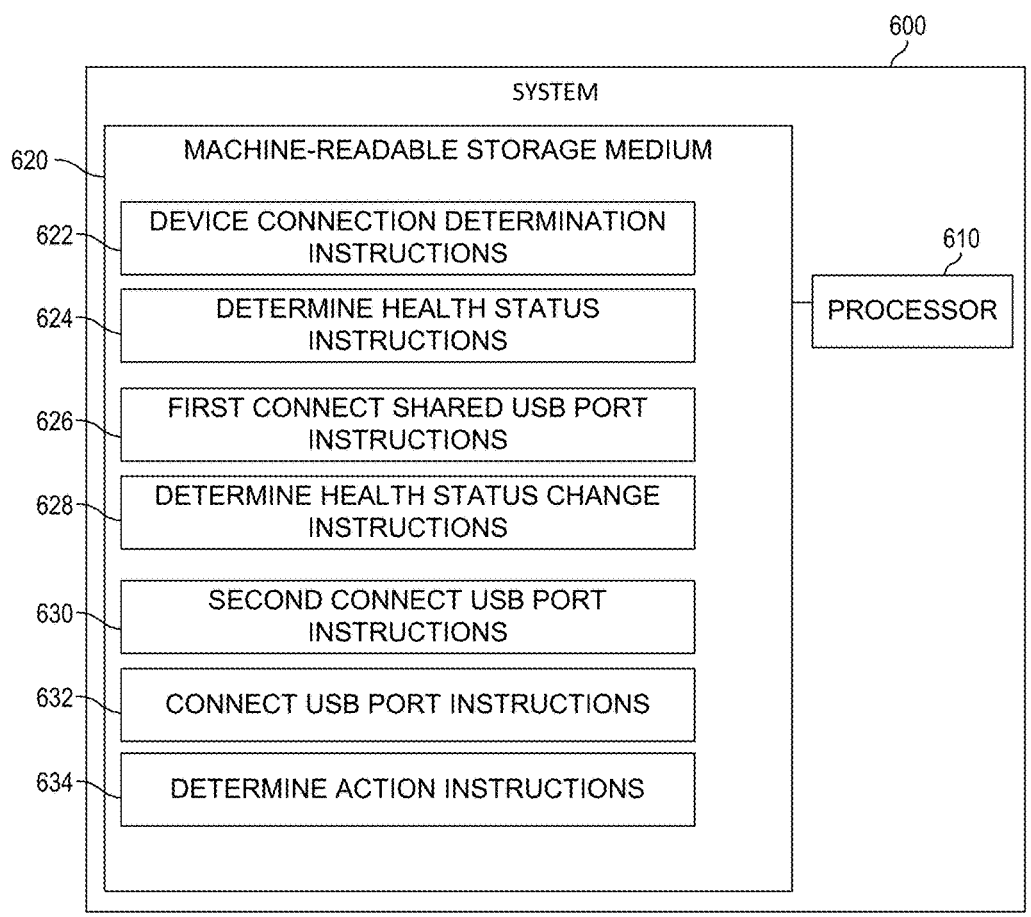
FIG. 6 is a block diagram of an example system for sharing USB ports.

FIG. 6 is a block diagram of an example system for sharing USB ports. System 600 may be similar to system 100 of FIG. 1 or system 200 of FIG. 2, for example. In the example of FIG. 6, system 600 includes a processor 610 and a machine-readable storage medium 620. In some examples, processor 610 may comprise chassis manager 110, first BMC 118, and/or second BMC 120. In some examples, chassis manager 110 may comprise logic and may not comprise processor 610.

Storage medium 620 is non-transitory in various examples. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 610 may be one or more central processing units (CPUs), microprocessors, and/or other hardware devices suitable for retrieval and execution of instructions stored in machine-readable storage medium 620. In the particular examples shown in FIG. 6, processor 610 may fetch, decode, and execute instructions 622, 624, 626, 628, 630, 632, and 634 to share USB ports. As an alternative or in addition to retrieving and executing instructions, processor 610 may include one or more electronic circuits comprising a number of electronic components for performing the functionality of one or more of the instructions in machine-readable storage medium 620. With respect to the executable instruction representations (e.g., boxes) described and shown herein, it should be understood that part or all of the executable instructions and/or electronic circuits included within one box may, in alternate examples, be included in a different box shown in the figures or in a different box not shown.

Machine-readable storage medium 620 may be any electronic, magnetic, optical, or other physical storage device that stores executable instructions. Thus, machine-readable storage medium 620 may be, for example, Random Access Memory (RAM), an Electrically-Erasable Programmable Read-Only Memory (EEPROM), a storage drive, an optical disc, and the like. Machine-readable storage medium 620 may be disposed within system 600, as shown in FIG. 6. In this situation, the executable instructions may be "installed" on the system 600. Alternatively, machine-readable storage medium 620 may be a portable, external or remote storage medium, for example, that allows system 600 to download the instructions from the portable/external/remote storage medium. In this situation, the executable instructions may be part of an "installation package". As described herein, machine-readable storage medium 620 may be encoded with executable instructions to allow sharing of USB ports.

Referring to FIG. 6, device connection determination instructions 622, when executed by a processor (e.g., 610), may cause processor 610 to determine that a universal serial bus (USB) device has been connected to a shared USB port, wherein the shared USB port is coupled to a multiplexor. The first USB port may be coupled to a first baseboard management controller (BMC) of the first computing device and to the multiplexor. The second USB port may be coupled to a second BMC and to the multiplexor.

Determine health status instructions 624, when executed, may cause processor 610 to determine a health status of the first computing device and the second computing device. First connect shared USB port instructions 626, when executed, may cause processor 610 to connect, by the multiplexor, the shared USB port to a first computing device or a second computing device based on the determined health status.

Determine health status change instructions 628, when executed, may cause processor 610 to determine a health status of the first computing device has changed. Responsive to determining that the health status has changed, second connect USB port instructions 632 may cause processor 610 to connect the USB port, with the multiplexor, to the first computing device.

Determine action instructions 634, when executed, may cause processor 610 to determine an action to perform. In some examples, the action to perform may be based on an identifier of a USB device. In some examples, the action to perform may base based on data stored on the USB device.

In some examples, the action may comprise downloading a health log to a USB device. In some examples, the action may cause processor 610 to: execute, with the first BMC, a script stored on the USB device, perform an action, with the first BMC, on the first computing device based on a first command of the script, and switch the shared USB port to the second computing device based on a second command of the script.

The invention claimed is:

1. A method comprising:
    detecting that a universal serial bus (USB) device has been connected to a shared USB port, wherein the shared USB port is shared, via a multiplexor, between a first baseboard management controller (BMC) of a first computing device and a second (BMC) of a second computing device;
    connecting, with a chassis manager coupled to the first computing device and the second computing device and by the multiplexor, the shared USB port to the first BMC or the second BMC,
    executing, with the first BMC, a script stored on the USB device, wherein executing the script comprises:
    performing a first action, with the first BMC, on the first computing device based on a first command of the script; and
    switching, by the chassis manager, the shared USB port to the second computing device based on a second command of the script.

2. The method of claim 1, comprising:
    determining, by the chassis manager, that a health status of the first computing device has changed; and
    responsive to determining that the health status has changed,
    connecting the shared USB port, with the multiplexor, to the first computing device.

3. The method of claim 1, comprising:
    performing an action based on an identifier of a USB device connected to the USB port.

4. The method of claim 3, performing the action based on the identifier of the USB device comprises performing at least one of:
    downloading a health log to the USB device, updating a firmware of the first computing device or the second computing device, or outputting a console to the USB device.

5. The method of claim 3, comprising:
    performing an action based on data stored on the USB device.

6. A system comprising:
    a first computing device comprising a first baseboard management controller (BMC);
    a second computing device comprising a second BMC;
    a first universal serial bus (USB) port coupled to the first BMC;
    a second USB port coupled to the second BMC;
    a multiplexor coupled to the first USB port and the second USB port;
    a shared USB port coupled to the multiplexor; and
    a chassis manager coupled to the first computing device and the second computing device,
    the chassis manager to:
    connect, with the multiplexor, the shared port to the first USB port or the second USB port,
    determine that a USB device has been connected to the shared USB port;
    responsive to a USB device being connected to the shared USB port,
    determine an action to perform, by the shared USB port, based on a USB identifier of the USB device, and
    wherein the action comprises transmitting a health log to the connected USB device.

7. The system of claim 6, wherein the first computing device, the second computing device, and the chassis manager are disposed within a common chassis,
    the chassis manager to:
    determine a health status of the first computing device and the second computing device.

8. The system of claim 7, the chassis manager to:
    select the first USB port responsive to determining that the health status of the first computing device indicates a problem with the first computing device.

9. The system of claim 6, the chassis manager to:
    determine that a USB device has been connected to the shared USB port; and
    determine an action to perform, with the shared USB port, based on data stored on the USB device.

10. The system of claim 6,
    wherein the chassis manager is to determine that a USB device has been connected to the shared USB port, wherein the first BMC is to execute a script stored on the USB device, wherein to execute the script, the first BMC is to:
perform a first action, with the first BMC, on the first computing device based on a first command of the script, and wherein the chassis manager is to:
switch the shared USB port to the second USB port based on a second command of the script.

11. A non-transitory machine-readable storage medium encoded with instructions that, when executed, cause a processor to:
determine that a universal serial bus (USB) device has been connected to a shared USB port, wherein the shared USB port is coupled to a multiplexor,
wherein the first USB port is coupled to a first baseboard management controller (BMC) of a first computing device and to the multiplexor,
wherein the second USB port is coupled to a second BMC and to the multiplexor;
determine a health status of the first computing device and a second computing device;
connect, by the multiplexor, the shared USB port to a first computing device or a second computing device based on the determined health status, and
determine an action to perform based on data stored on the USB device, wherein the instructions that cause the processor to perform the action comprise instructions that, when executed, cause the processor to:
download a health log to the USB device.

12. The non-transitory computer-readable storage medium of claim 11, comprising instructions stored thereon that, when executed, cause the processor to:
determine a health status of the first computing device has changed; and
responsive to determining that the health status has changed, connect the USB port, with the multiplexor, to the first computing device.

13. The non-transitory computer-readable storage medium of claim 11, comprising instructions stored thereon that, when executed, cause the processor to:
determine an action to perform based on an identifier of a USB device connected to the USB port.

14. The non-transitory computer-readable storage medium of claim 11, wherein the instructions that cause the processor to perform the action comprise instructions that, when executed, cause the processor to:
execute, with the first BMC, a script stored on the USB device;
perform an action, with the first BMC, on the first computing device based on a first command of the script; and
switch the shared USB port to the second computing device based on a second command of the script.

* * * * *